United States Patent
Lee et al.

(10) Patent No.: US 9,181,051 B2
(45) Date of Patent: Nov. 10, 2015

(54) SHEET FEEDING DEVICE AND IMAGE FORMING APPARATUS INCLUDING THE SAME

(71) Applicant: SAMSUNG ELECTRONICS CO., LTD., Suwon-si, Gyeonggi-do (KR)

(72) Inventors: Jae Wuk Lee, Suwon-si (KR); Je Won Jeong, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/451,512

(22) Filed: Aug. 5, 2014

(65) Prior Publication Data
US 2015/0042034 A1    Feb. 12, 2015

(30) Foreign Application Priority Data
Aug. 9, 2013  (KR) .................. 10-2013-0094830

(51) Int. Cl.
*B65H 3/52* (2006.01)
*B65H 3/06* (2006.01)
*B65H 7/18* (2006.01)
*F16H 3/02* (2006.01)

(52) U.S. Cl.
CPC ............ *B65H 3/0669* (2013.01); *B65H 3/0684* (2013.01); *B65H 3/5215* (2013.01); *B65H 3/5261* (2013.01); *B65H 7/18* (2013.01); *F16H 3/02* (2013.01); *B65H 2403/40* (2013.01); *B65H 2403/722* (2013.01); *B65H 2511/20* (2013.01); *B65H 2511/414* (2013.01); *B65H 2511/416* (2013.01)

(58) Field of Classification Search
CPC .. B65H 3/5261; B65H 3/5246; B65H 3/0669; B65H 3/0684
See application file for complete search history.

(56) References Cited

U.S. PATENT DOCUMENTS

| | | | | |
|---|---|---|---|---|
| 5,901,951 | A * | 5/1999 | Yamaguchi | 271/10.11 |
| 6,792,242 | B2 * | 9/2004 | Suzaki | 399/392 |
| 7,429,040 | B2 * | 9/2008 | Ueda et al. | 271/122 |
| 8,844,923 | B2 * | 9/2014 | Ota et al. | 271/125 |
| 2005/0062826 | A1 * | 3/2005 | Kim et al. | 347/104 |

FOREIGN PATENT DOCUMENTS

JP    05017040 A  *  1/1993

* cited by examiner

*Primary Examiner* — Luis A Gonzalez
(74) *Attorney, Agent, or Firm* — Staas & Halsey LLP

(57) ABSTRACT

A sheet feeding device selectively transmit a driving force transmitted to a double gear type driving gear to a first reverse gear to rotate a retard roller in a direction opposite to a rotation direction of a forward roller such that various kinds of sheets having different friction forces are separated and supplied, and an image forming apparatus including the same.

16 Claims, 16 Drawing Sheets

SHEET FEEDING DEVICE AND IMAGE FORMING APPARATUS INCLUDING THE SAME

CROSS-REFERENCE TO RELATED APPLICATIONS

This application claims priority under 35 U.S.C. §119 from Korean Patent Application No. 10-2013-0094830, filed on Aug. 9, 2013 in the Korean Intellectual Property Office, the disclosure of which is incorporated herein by reference.

BACKGROUND OF THE INVENTION

1. Field of the Invention

Embodiments of the present general inventive concept relate to a sheet feeding device to provide optimum separating performance based on supplied sheets and an image forming apparatus including the same.

2. Description of the Related Art

An image forming apparatus forms an image on a sheet according to an input signal. The image forming apparatus includes a printer, copier, facsimile, and a multifunction device having functions of the printer, copier, and facsimile.

An electrophotographic image forming apparatus includes a photoconductor, an optical scanning device, and a developing device. The optical scanning device scans light to the photoconductor, which is charged with predetermined potential, to form an electrostatic latent image on the surface of the photoconductor. The developing device supplies a developing agent to the photoconductor, on which the electrostatic latent image is formed, to form a visible image. The visible image formed on the photoconductor is directly transferred to a sheet. Alternatively, the visible image is transferred to a sheet via an intermediate transfer device. The image transferred to the sheet is fixed to the sheet by fusing.

The image forming apparatus may include a sheet pickup device to pick up sheets loaded in a cassette or a tray one by one and a sheet supply device to feed picked-up sheets to a sheet feeding channel provided in the image forming apparatus. Two or more sheets may be picked up by the sheet pickup device and fed to the sheet feeding channel due to friction force of the sheets. Jam may occur in the image forming apparatus due to such multiple feeding of sheets.

In recent years, a retard type pickup structure has been developed. The retard type pickup structure includes a torque limiter and a retard roller connected to the torque limiter such that the retard roller is rotated forward or reversely according to the torque limiter to prevent multiple feeding of sheets. The torque limiter has a predetermined critical torque value. When sheet feeding friction force is greater than the critical torque value, the retard roller is rotated forward. When the sheet feeding friction force is less than the critical torque value, the retard roller is rotated reversely. The retard roller is disposed below the sheet feeding channel to prevent multiple feeding of sheets.

When no sheets are fed to the sheet feeding channel or only one sheet is fed to the sheet feeding channel, the sheet feeding friction force is greater than the critical torque value of the torque limiter. As a result, the torque limiter and the retard roller may be rotated in the sheet feeding direction to feed the sheet. When two or more sheets are fed to the sheet feeding channel, the sheet feeding friction force is less than the critical torque value of the torque limiter. As a result, the torque limiter and the retard roller are rotated in a direction opposite to the sheet feeding direction to prevent multiple feeding of sheets.

In a conventional structure, a reverse gear is provided to reversely rotate a retard roller or only the retard roller is provided without the reverse gear to achieve separation between sheets. However, the conventional structure may not provide a sheet separation area in which various kinds of sheets having different thicknesses, materials, and friction forces may are separated from each other.

SUMMARY OF THE INVENTION

The present general inventive concept provides a sheet feeding device to selectively transmit a driving force transmitted to a double gear type driving gear to a first reverse gear via a second reverse gear to rotate a retard roller in a direction opposite to a rotation direction of a forward roller such that various kinds of sheets having different friction forces, such as special sheets having a low coefficient of friction, may be accurately separated and supplied and an image forming apparatus including the same.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an image forming apparatus including a developing device to form an image on a sheet, a sheet supply tray to store sheets to be supplied to the developing device, and a sheet feeding device to pick up and feed the sheets stored in the sheet supply tray to developing device, wherein the sheet feeding device includes a housing, a pickup unit provided in the housing to pick up the sheets, a feeding part to feed the sheets picked-up by the pickup unit, and a multiple feeding prevention part rotated in an opposite direction to a feeding direction of the sheets to prevent multiple feeding of the sheets, driving force being selectively transmitted to the multiple feeding prevention part.

When special sheets having a lower coefficient of friction than normal sheets are fed, the driving force may be transmitted to the multiple feeding prevention part such that the multiple feeding prevention part rotated in an opposite direction to a feeding direction of the special sheets.

The feeding part may include a forward roller to feed sheets, a forward shaft extending through the forward roller, and a driving gear mounted at the forward shaft such that driving force is transmitted to the driving gear.

The multiple feeding prevention part may include a retard roller contacting sheets, a retard shaft extending through the retard roller, and a first reverse gear mounted at the retard shaft such that driving force is selectively transmitted to the first reverse gear.

The retard shaft may be provided with a torque limiter. The retard shaft may be rotated in the same direction as the forward roller when sheet feeding friction force is greater than a critical torque value of the torque limiter. The retard shaft may be rotated in an opposite direction to the forward roller when the sheet feeding friction force is less than the critical torque value of the torque limiter.

The housing may be provided with a second reverse gear selectively engaged with the driving gear and the first reverse gear.

The second reverse gear may be a double gear.

The housing may be provided with a fixing shaft and the second reverse gear may be moved to a front or a rear of the fixing shaft such that the second reverse gear is selectively engaged with the driving gear and the first reverse gear.

The second reverse gear may be provided in a gear holder such that the gear holder and the second reverse gear are moved along the fixing shaft.

The gear holder may be provided with a gear part engaged with a gear connected to a motor and the gear holder and the second reverse gear may be moved along the fixing shaft when the gear connected to the motor is rotated while being engaged with the gear part.

The gear holder may be provided with a fixing protrusion to selectively interfere with the first reverse gear.

The fixing protrusion may interfere with the first reverse gear to fix the first reverse gear in a state in which the second reverse gear is not engaged with the driving gear and the first reverse gear.

The second reverse gear may be engaged with the driving gear and the when sheets having a lower coefficient of friction than normal sheets are fed.

The driving force transmitted to the driving gear may be transmitted to the first reverse gear via the second reverse gear to rotate the first reverse gear.

The retard roller may be rotated in an opposite direction to the forward roller by the first reverse gear to prevent multiple feeding of sheets.

The foregoing and/or other features and utilities of the present general inventive concept may also be achieved by providing a sheet feeding device including a housing, a pickup unit provided in the housing to pick up the sheets, a feeding part provided in the housing while being connected to a drive unit, to feed the sheets picked-up by the pickup unit, and a multiple feeding prevention part to perform separation between the sheets fed by the feeding part to prevent multiple feeding of sheets, wherein, when special sheets having a lower coefficient of friction than normal sheets are fed, the multiple feeding prevention part is selectively connected to the feeding part to receive driving force such that the multiple feeding prevention part is rotated in an opposite direction to a feeding direction of the sheets to perform separation between the sheets.

The feeding part may include a forward shaft extending through a forward roller and a driving gear mounted at the forward shaft such that driving force is transmitted to the driving gear.

The multiple feeding prevention part may include a retard shaft extending through a retard roller, a torque limiter mounted at the retard shaft, and a first reverse gear mounted at the retard shaft such that the first reverse gear is rotated when the first reverse gear is selectively connected to the driving gear.

A second reverse gear may be movably provided in the housing. When special sheets having a lower coefficient of friction than normal sheets are fed, the second reverse gear may be selectively engaged with the driving gear and the first reverse gear to transmit driving force from the driving gear to the first reverse gear.

The second reverse gear may be provided with a one-way bearing. When the second reverse gear is not engaged with the first reverse gear by the one-way bearing, the first reverse gear may be fixed without rotation.

The foregoing and/or other features and utilities of the present general inventive concept may also be achieved by providing a sheet feeding device to feed sheets into an apparatus body in an image forming apparatus, the sheet feeding device including a housing, a pickup unit provided in the housing to pick up the sheets, a feeding part to feed the sheets picked-up by the pickup unit, and a multiple feeding prevention part rotated in an opposite direction to a feeding direction of the sheets to prevent multiple feeding of the sheets such that a driving force to drive the multiple feeding prevention part is selectively transmitted to the multiple feeding prevention part.

The foregoing and/or other features and utilities of the present general inventive concept may also be achieved by providing an image forming apparatus including an apparatus body and a sheet feeding device to feed sheets into the apparatus body, the sheet feeding device including a housing, a pickup unit provided in the housing to pick up the sheets, a feeding part to feed the sheets picked-up by the pickup unit in a feeding direction, a multiple feeding prevention part to rotate in an opposite direction to a feeding direction of the sheets to prevent multiple feeding of the sheets in the feeding direction, and a moving unit to selectively transmit a driving force to drive the multiple feeding prevention part according to a friction force of the sheets.

The image forming apparatus may further include a driving gear disposed to drive the pickup unit and the feeding part, and the multiple feeding prevention part may include a retard roller unit to selectively rotate in the feeding direction of the sheets to prevent multiple feeding of the sheets in the feeding direction, a first reverse gear to drive the retard roller unit, and a second reverse gear to be selectively engaged with the driving gear to selectively transmit a rotation force of the driving gear to the first reverse gear and the retard roller unit.

The second reverse gear may include a first portion to be selectively engaged with the driving gear, and a second portion to be engaged with the first reverse gear regardless of engagement and disengagement of the first portion with the driving gear.

The multiple feeding prevention part may include a gear holder disposed to move together with the second reverse gear, and the moving unit may be one of a pinion and rack unit and a solenoid to move the gear holder.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
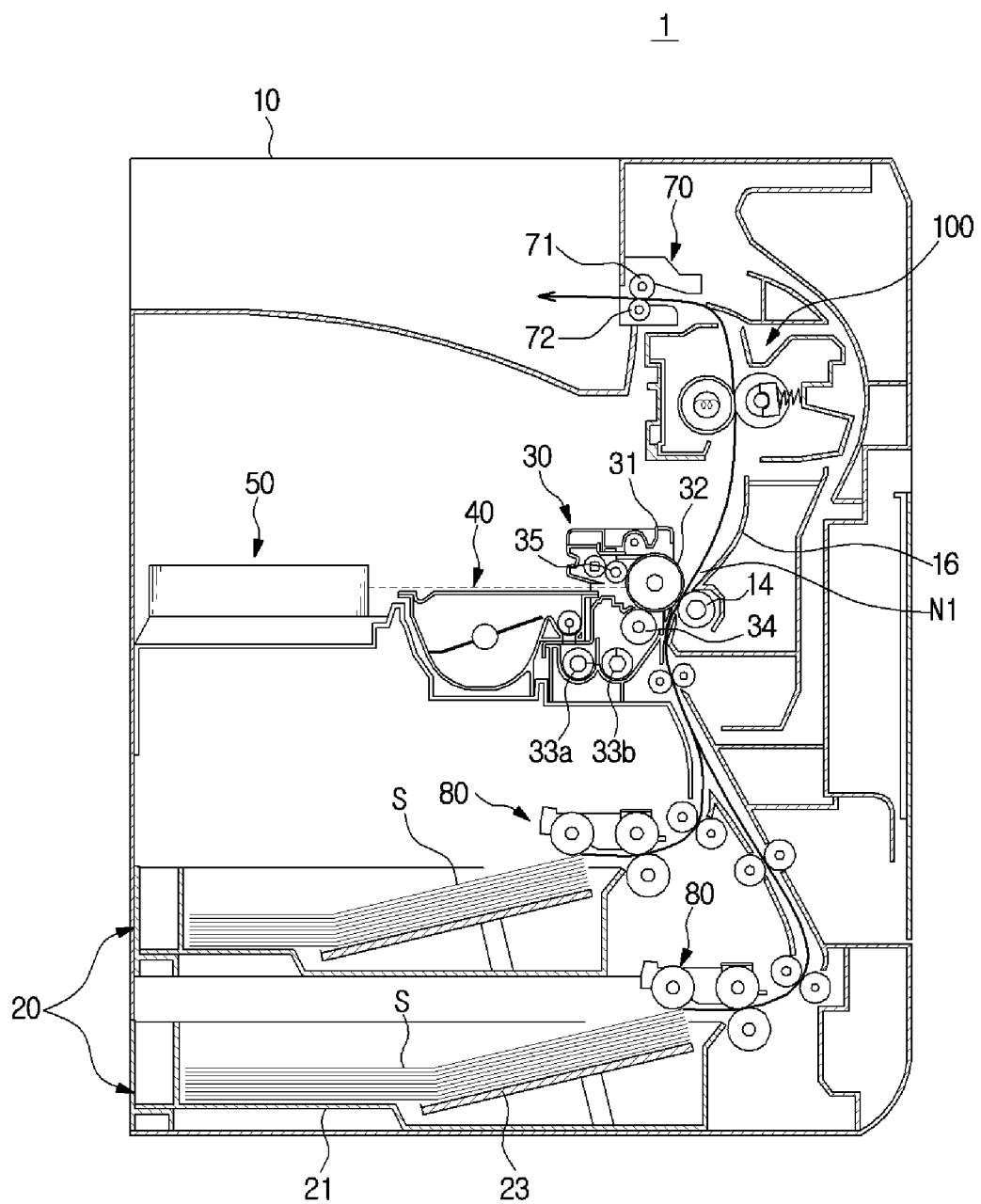
FIG. 1 is a view illustrating an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a view illustrating an image forming apparatus 1 according to an embodiment of the present general inventive concept.

Referring to FIG. 1, the image forming apparatus 1 includes an apparatus body 10, a sheet supply device 20 to store and supply sheets S, a developing device 30 to form an image on a sheet S supplied by the sheet supply device 20, a toner device 40 to supply toner to the developing device 30, an optical scanning device 50 to form an electrostatic latent image on a photoconductor 32 of the developing device 30, a fusing device 100 to fuse a toner image transferred to the sheet S on the sheet S, and a sheet discharge device 70 to discharge the sheet S having the image finally formed thereon out of the apparatus body 10.

The sheet supply device 20 stores and supplies sheets S. The sheet supply device 20 is provided at a lower portion of the apparatus body 10 to supply the sheets S to the developing device 30.

The sheet supply device 20 may include a cassette type sheet supply tray 21 configured to be detachably attached to the apparatus body 10 such that sheets S are stored in the cassette type sheet supply tray 21 and a sheet feeding device 80 to pick up the sheets S stored in the sheet supply tray 21 one by one and to feed each picked-up sheet S to the developing device 30.

The sheet supply tray 21 may include a knock up plate 23 configured to be raised by a force using a motor or an elastic member in a state in which one end of the knock up plate 23 is rotatably coupled to the sheet supply tray 21 such that the stored sheets S are guided to the sheet feeding device 80.

The sheet feeding device 80 includes a pickup unit 81 to pick up the sheets S loaded on the knock up plate 23 one by one and a feeding unit 82 and 83 to feed each sheet S picked-up by the pickup unit 81 to the developing device 30.

The developing device 30 includes a housing 31 forming the external appearance thereof, a photoconductor 32 rotatably coupled in the housing 31 to form an electrostatic latent image, agitating screws 33a and 33b to agitate toner supplied from the toner device 40, a developing roller 34 to supply the toner agitated by the agitating screws 33a and 33b to the photoconductor 32, and a charging member 35 to charge the photoconductor 32 with predetermined potential.

The toner supplied from the toner device 40 is introduced into the housing 31, fed to one side of the housing 31 while being agitated by the agitating screws 33a and 33b, and supplied to the photoconductor 32 via the developing roller 34 to form a toner image as a visible image.

The photoconductor 32 is disposed to contact or face a transfer roller 14 to form a transfer nip N1 such that the toner supplied to the photoconductor 32 to form the visible image is transferred to a sheet S. The transfer roller 14 may be rotatably disposed in the apparatus body 10.

The toner device 40 is coupled to the developing device 30. The toner device 40 stores toner usable to form the image on the sheet S and supplies the toner to the developing device 30 when an image forming operation is performed.

The optical scanning device 50 scans light including image information to the photoconductor 32 to form an electrostatic latent image on the photoconductor 32.

The fusing device 100 applies heat and pressure to the toner image formed on the sheet S to fuse the toner image to the sheet S. The structure of the fusing device 100 will hereinafter be described in detail.

The sheet discharge device 70, including a first sheet discharge roller 71 and a second sheet discharge roller 72, discharges the sheet S having passed through the fusing device 100 out of the apparatus body 10.

Hereinafter, a sheet feeding device 80 according to an embodiment of the present invention will be described in detail with reference to the accompanying drawings.

Figure 2:
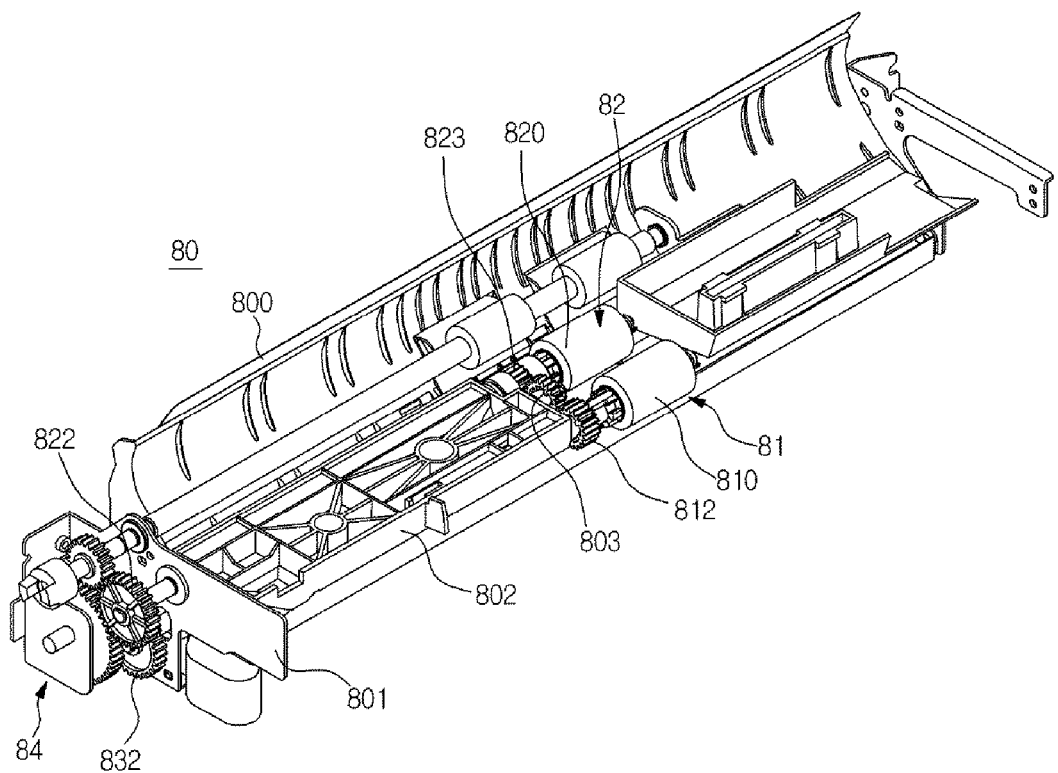
FIG. 2 is a view illustrating a sheet feeding device according to an embodiment of the present general inventive concept.
Figure 3:
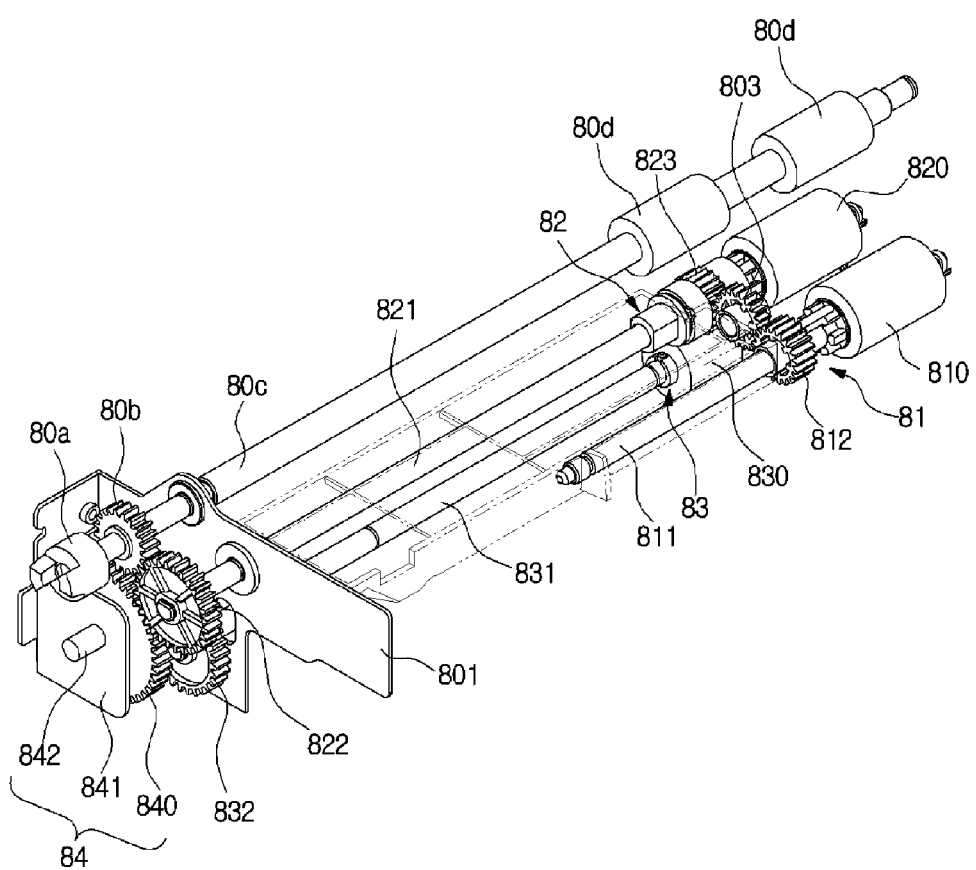
FIG. 3 is a view illustrating a feeding roller of the sheet feeding device according to the embodiment of the present general inventive concept.
Figure 4:
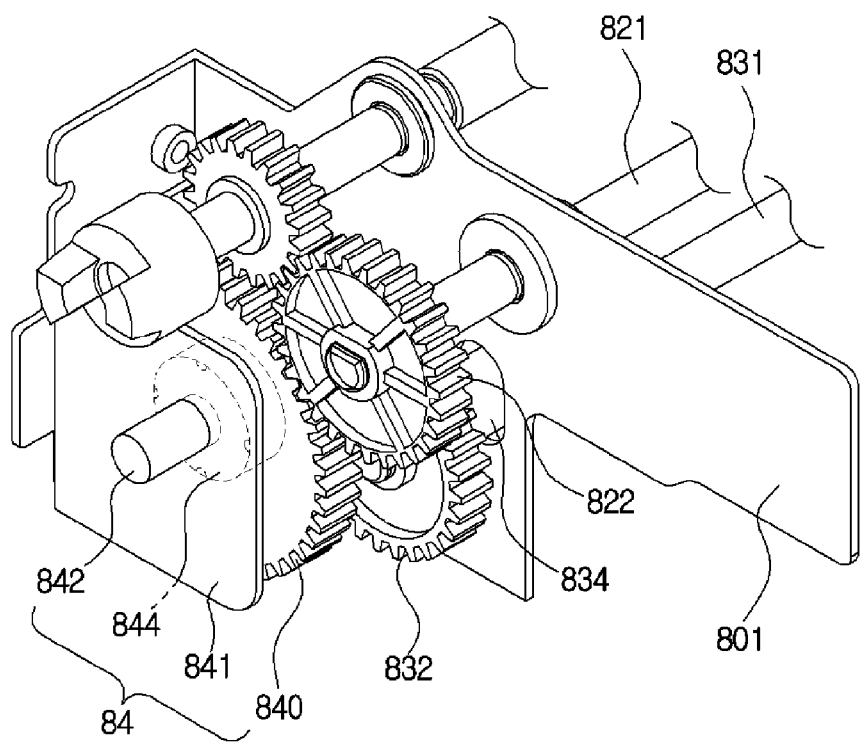
FIGS. 4 and 5 are views illustrating a connected state of a reversing gear of the sheet feeding device according to the embodiment of the present general inventive concept.
Figure 5:
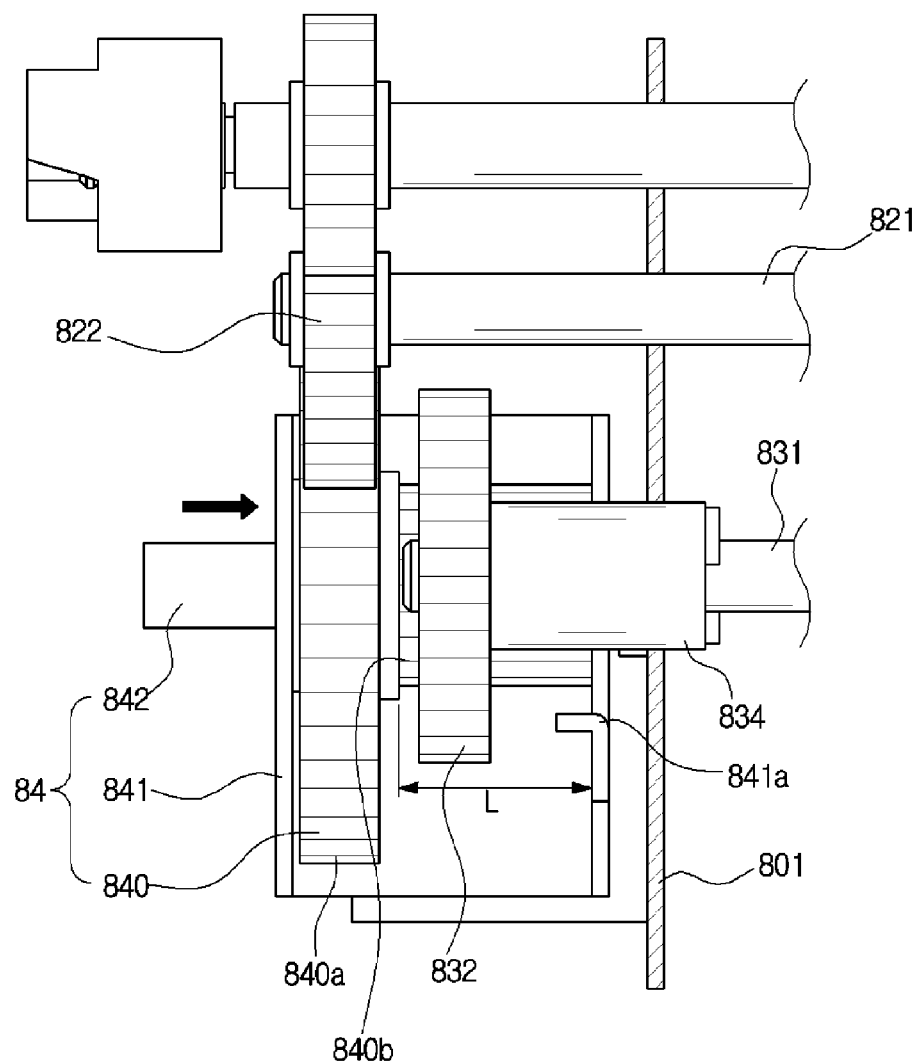
Figure 6:
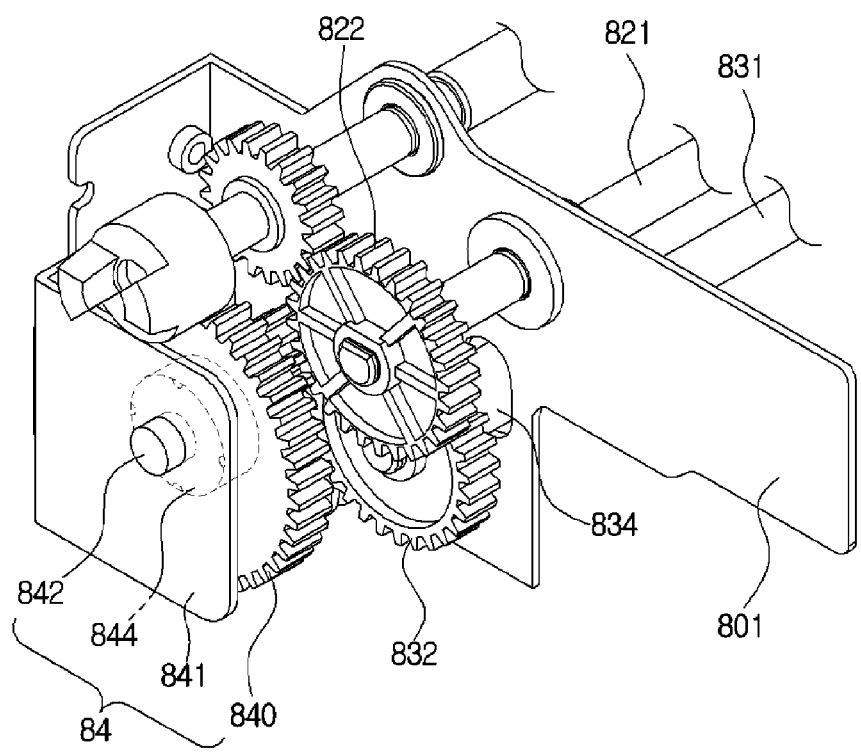
FIGS. 6 and 7 are views illustrating a disconnected state of the reversing gear of the sheet feeding device according to the embodiment of the present general inventive concept.
Figure 7:
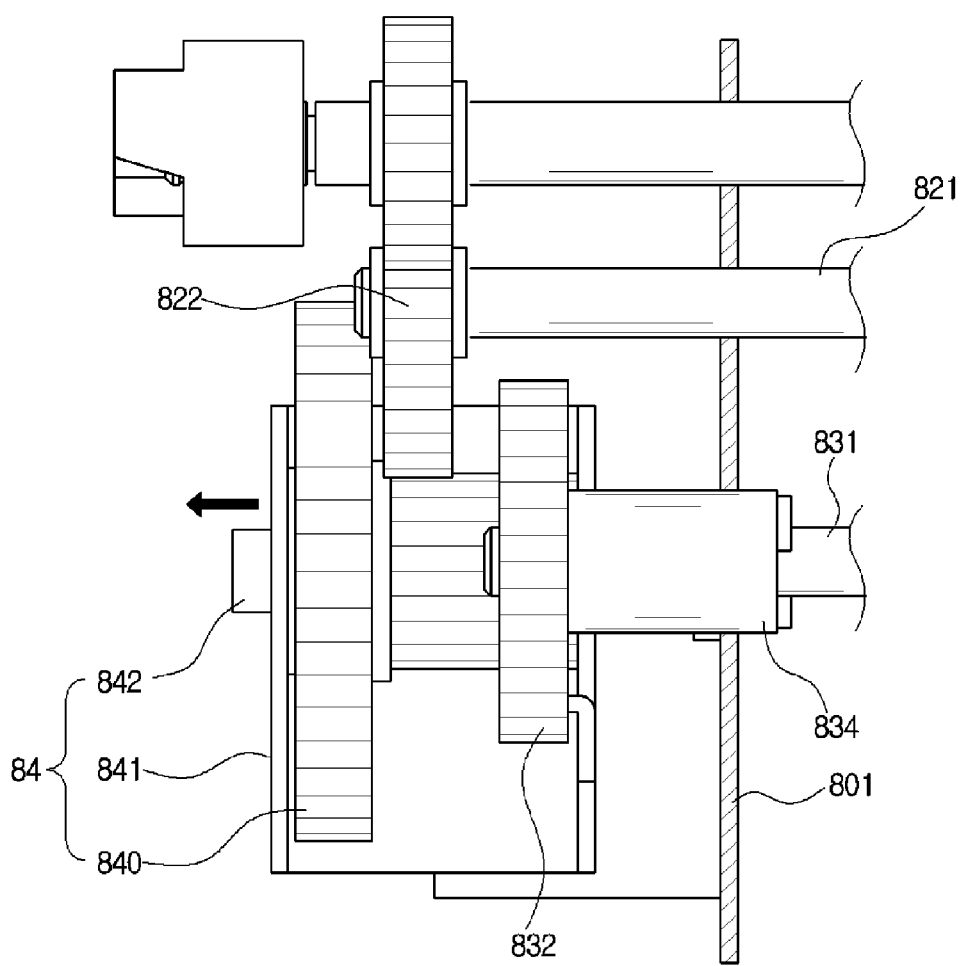

FIG. 2 is a view illustrating the sheet feeding device 80 the image forming apparatus 1 of FIG. 1 according to an embodiment of the present general inventive concept, FIG. 3 is a view illustrating rollers of the sheet feeding device 80 according to the embodiment of the present general inventive concept, FIGS. 4 and 5 are views illustrating a connected state and a disconnected state of a reversing gear of the sheet feeding device 80 according to the embodiment of the present general inventive concept, FIGS. 6 and 7 are views illustrating a disconnected state of the reversing gear of the sheet feeding device 80 according to the embodiment of the present general present inventive concept.

Referring to FIGS. 2 to 7, the sheet feeding device 80 may include a pickup unit 81 and a feeding unit 82 and 83. The feeding unit 82 and 83 may include a feeding part 82 and a multiple feeding prevention part 83. The sheet feeding device 80 may further include a housing 800. The pickup unit 81 and the feeding unit 82 and 83 may be provided in the housing 800.

The pickup unit 81 includes a pickup roller 810 and a pickup shaft 811. The pickup shaft 811 may extend through the pickup roller 810 such that the pickup roller 810 and the pickup shaft 811 are rotated together. The pickup roller 810 may pick up a sheet S and feed the picked-up sheet S to the feeding unit 82 and 83. The pickup shaft 811 may be provided with a connection gear 812.

The feeding part 82 may include a forward roller 820, a forward shaft 821, and a driving gear 822. The forward shaft 821 extends through the forward roller 820 such that the forward roller 820 and the forward shaft 821 are rotated together. The driving gear 822 may be provided at one side of the forward shaft 821.

The driving gear 822 may be connected to a drive unit, for example, a motor or a rotation power source (not illustrated). The driving gear 822 may be rotated by a driving force of the drive unit (not illustrated). It is possible that the driving force may be transmitted from the driving gear 822 to a gear 80b connected to the driving gear 822, a shaft 80c coupled to the gear 80b, and one or more rollers, for example, feeding roller to receive the sheet S from the forward roller 820 and feed the sheet S to the transfer nip N1 of a sheet path as illustrated in FIG. 3. It is also possible that the driving force may be received through a coupler 80a connected to a motor (not illustrated) and transmitted to the gear 80b and the driving gear 822. The forward shaft 821 may be provided with a transmission gear 823.

A connection part 802 may be located on a side of the forward shaft 821 and a side of the pickup shaft 811. The connection part 802 may have a structure to support and/or accommodate the pickup shaft 811, the retard shaft 831, and/or the forward shaft 821. A middle gear 803 may be provided at one side of the connection part 802. The middle gear 803 may be engaged with the connection gear 812 of the pickup shaft 811 and the transmission gear 823 of the forward shaft 821.

When the forward shaft 821 is rotated by the driving force transmitted to the driving gear 822 of the forward shaft 821, the transmission gear 823 of the forward shaft 821 is rotated. When the transmission gear 823 is rotated, the connection gear 812 engaged with the middle gear 803 may be rotated. When the connection gear 812 is rotated, the pickup shaft 811 connected to the connection gear 812 rotates. The pickup roller 810 may pick up a sheet S while rotating with the pickup shaft 811. The pickup roller 810 and the forward roller 820 may rotate in a same direction.

The multiple feeding prevention part 83, including a retard roller 830, a retard shaft 831, a first reverse gear 832, and a torque limiter 834, may prevent multiple feeding of sheets S. The retard roller 830 may be provided at the retard shaft 831 such that the retard roller 830 is rotated together with the retard shaft 831. The sheets S may be fed through a gap between the forward roller 820 and the retard roller 830. The first reverse gear 832 may be provided at the retard shaft 831.

The torque limiter 834 may be provided at the retard shaft 831. When a sheet feeding friction force is greater than a critical torque value of the torque limiter 834, the retard roller 830 may be rotated in the same direction as the forward roller 820. When the sheet feeding friction force is less than the critical torque value of the torque limiter 834, the retard roller 830 may be rotated in the opposite direction to the forward roller 820. The retard roller 830 may be rotated forward together with the torque limiter 834 to prevent multiple feeding of sheets S.

The housing 800 may be provided at one side thereof with a gear bracket 801. The driving gear 822 may be mounted to the forward shaft 821 extending through the gear bracket 801. Similarly, the first reverse gear 832 may be mounted to the retard shaft 831 extending through the gear bracket 801.

The gear bracket 801 may be provided with a second reverse gear assembly 84. The second reverse gear assembly 84 may include a double gear type second reverse gear 840. The second reverse gear 840 may have a first gear portion 840a to be engaged with the first reverse gear 832 mounted to the retard shaft 831 a second gear portion 840b to be selectively engaged with the driving gear 822 mounted to the forward shaft 821 as illustrated in FIG. 5. The gear bracket 801 may be provided with a fixing shaft 842 protruding toward an outside thereof at which the driving gear 822 and the first reverse gear 832 are located. The second reverse gear 840 may be mounted to the fixing shaft 842 such that the second reverse gear 840 is movable in an axial direction of the fixing shaft 842.

The second gear portion 840b may have a length L in an axial direction of the fixing shaft 842 to maintain the engagement with the first reverse gear 832 regardless of the engagement and disengagement between the driving gear 822 and the first gear portion 840a of the second reverse 840. It is possible that the second gear portion 840b may have a length to be engaged with and disengaged from the first reverse gear 832 according to the engagement and disengagement between the driving gear 822 and the first gear portion 840a of the second reverse 840.

The second reverse gear 840 receives the driving force from the driving gear 822 and transmits the received driving force to the first reverse gear 840 and the retard shaft 831 so that the retard roller 830 can rotate when the second reverse gear 840 is engaged with the driving gear 822.

When the second reverse gear 840 is engaged with the driving gear 822 or when a sheet feeding friction force is greater than a critical torque value of the torque limiter 834, the pickup roller 810, the forward roller 820, and the retard roller 830 may rotate in a same direction such that a sheet S contacting the forward roller 810 can be fed along a feeding path and another sheet S contacting the retard roller 830 can be prevented from being fed together with the sheet S along the feeding path. When the second reverse gear 840 is disengaged from the driving gear 822 or when the sheet feeding friction force is less than the critical torque value of the torque limiter 834, the retard roller 830 may rotate in an opposite direction to the pickup roller 81 and the forward roller 820 such that the picked up sheet S can be fed along the feeding path by the opposite rotation of the forward roller 820 and the retard roller 830.

The second reverse gear assembly 84 may further include a gear holder 841. The second reverse gear 840 may be provided in the gear holder 841. The gear holder 841 may be movable along the fixing shaft 842. The second reverse gear 840 may be movable along the fixing shaft 842 together with the gear holder 841. When the gear holder 841 moves, the second reverse gear 840 may be engaged with or disengaged from the driving gear 822.

The second reverse gear 840 may approach a side of the driving gear 822 along the fixing shaft 842 such that the second reverse gear 840 is engaged with the driving gear 822. When the driving gear 822 is rotated by the driving force of the drive unit, the driving force may be transmitted to the first reverse gear 832 via the second reverse gear 840.

For example, when the driving gear 822 is rotated clockwise, the second reverse gear 840 engaged with the driving gear 822 may be rotated counterclockwise and the first reverse gear 832 engaged with the second reverse gear 840 may be rotated clockwise. When the driving gear 822 and the first reverse gear 832 are rotated clockwise, the forward shaft 821 connected to the driving gear 822 and the retard shaft 831 connected to the first reverse gear 832 are rotated clockwise. The forward roller 820 connected to the forward shaft 821 and the retard roller 830 connected to the retard shaft 831 may also be rotated clockwise together with the forward shaft 821 and the retard shaft 831, respectively.

The sheets S pass through the gap between the forward roller 820 and the retard roller 830. The forward roller 810 may apply a force to one side of each sheet S such that the sheet S is introduced and fed through the gap between the forward roller 820 and the retard roller 830. The retard roller 830 may apply a force to the other side of each sheet S in the opposite direction to the feeding direction of the sheet S. Even when two or more special sheets S with a low friction force and a high basis weight are fed, therefore, multiple feeding of the sheets S may be prevented by the retard roller 830.

The second reverse gear 840 may move along the fixing shaft 842 such that the second reverse gear 840 is disengaged from the driving gear 822. In this case, the first reverse gear 832 is not rotated even when the driving gear 822 is rotated. The sheets S may be introduced and fed through the gap between the forward roller 820 and the retard roller 830 by either one of the pickup roller 810 and the forward roller 820. For normal sheets S, a force is applied to one side of each sheet S by the forward roller 820 in the direction in which the sheet S is fed. Even when the retard roller 830 is not rotated, a friction force may be applied between the other side of each sheet S and the retard roller 830 in the opposite direction of the feeding direction of the sheet S. Multiple feeding of the sheets S may be prevented by a friction force between the retard roller 830 and the one or more sheets S.

In a state in which the second reverse gear 840 is disengaged from the driving gear 822 as described above, multiple feeding of normal sheets S may be prevented by the retard roller 830. However, multiple feeding of special sheets S with a high basis weight may not be prevented since the special sheets S have a low coefficient of friction. For the special sheets S, therefore, the second reverse gear 840 may be engaged with the driving gear 822 such that the retard roller 830 is rotated in the opposite direction of the feeding direction of the sheet S, thereby preventing multiple feeding of the special sheets S. Since the second reverse gear 840 is selectively engaged with the driving gear 822 as described above, separation force of the multiple feeding prevention part 83 may be appropriately adjusted according to properties of the sheets S such that multiple feeding of the sheets S is prevented.

The image forming apparatus 1 may have a moving device to move the second reverse gear 840 along the fixing shaft 842. The moving device may generate a force (driving force) to be applied to the second reverse gear 840 to be engaged with or disengaged from the driving gear 822. The moving device may operate according to a characteristic of the sheet S, a setting by a user through a user interface of the image forming apparatus, a setting by a controller controlling the functions of the image forming apparatus. The setting may be done manually or automatically according to a friction force of the sheet S detected by a sensor (not illustrated).

Figure 8A:
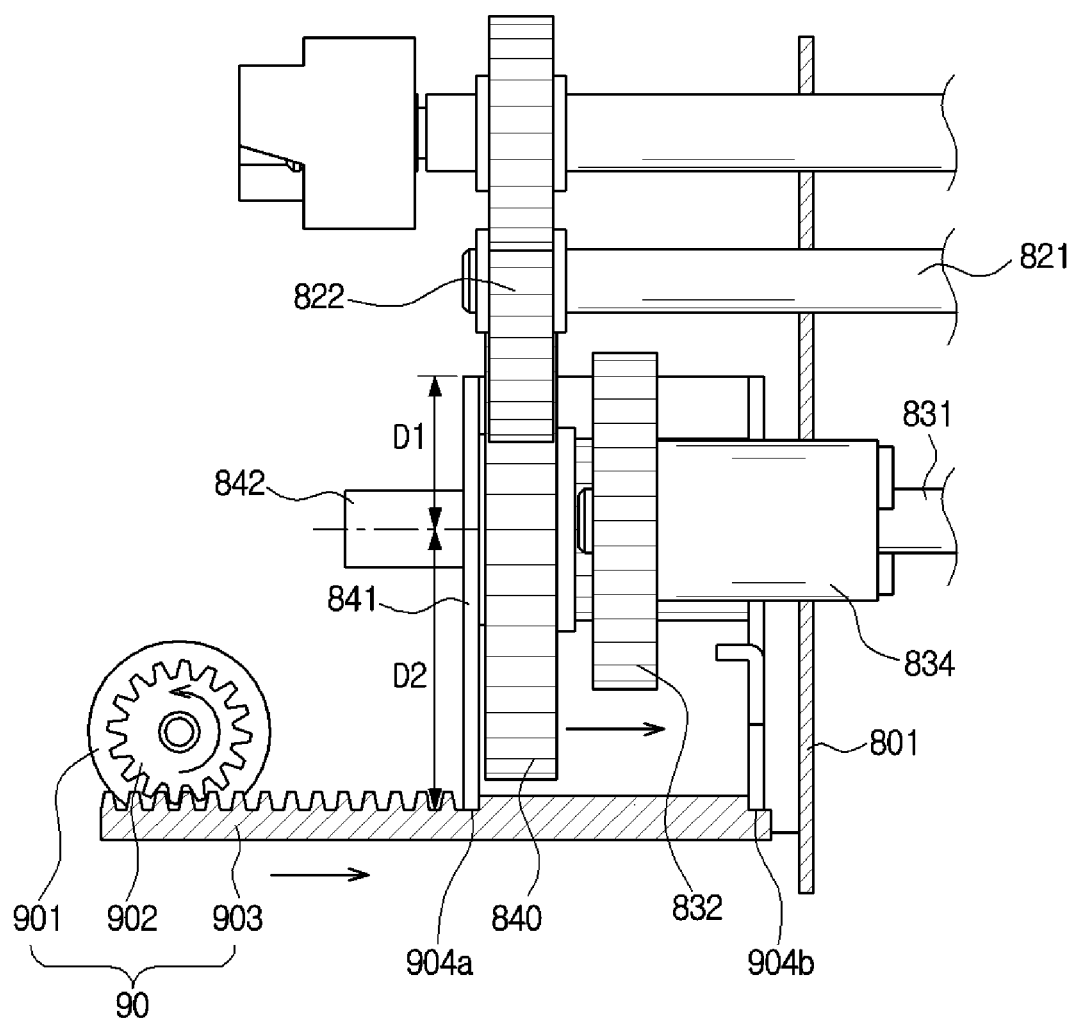
FIGS. 8A and 8B are views illustrating a second reversing gear moving device according to an embodiment of the present general inventive concept.
Figure 8B:
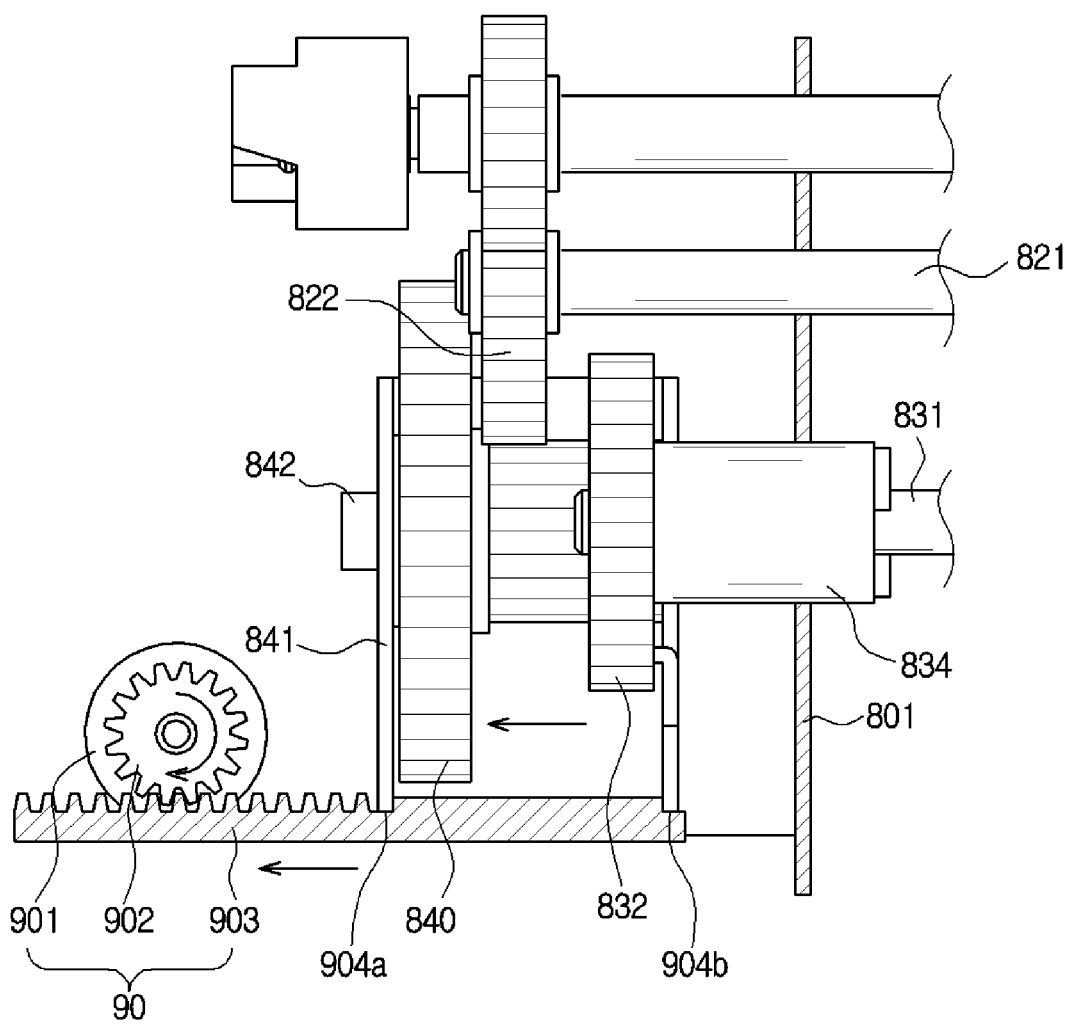

FIGS. 8A and 8B are views illustrating a second reversing gear moving device 90 usable with the sheet feeding device 80 of FIG. 1 according to an embodiment of the present general inventive concept.

Referring to FIG. 8, the second reversing gear moving device 90 may include a motor 901, a gear (or pinion) 902 connected to the motor 901, and a gear (or rack) 903 connected to the gear holder 841. The gear 902 connected to the motor 901 may be engaged with the gear 903. The gear 902 may be rotated clockwise or counterclockwise by a driving force of the motor 901 to move the gear 903 and the gear holder 841, to which the gear 903 is connected, in an axial direction of the fixing shaft 842. The second reverse gear 840 may be moved in the axial direction of the fixing shaft 842 together with the gear holder 841.

The second reversing gear moving device 90 may have at least one of portions 904a and 904b to be coupled to a corresponding portion of the gear holder 841. The gear holder 841 may have a distance D1 from a center of the fixing shaft 842 to one end of the gear holder 841 and a distance D2 from the center of the fixing shaft 842 to the other end of the gear holder 841. The at least one of the portions 904a and 904b may be connected to a portion of the the other end of the gear holder 841.

Since the second reverse gear 840 is moved in the axial direction of the fixing shaft 842 by the second reversing gear moving device 90 as described above, the second reverse gear 840 may be selectively engaged with the driving gear 822.

Figure 9A:
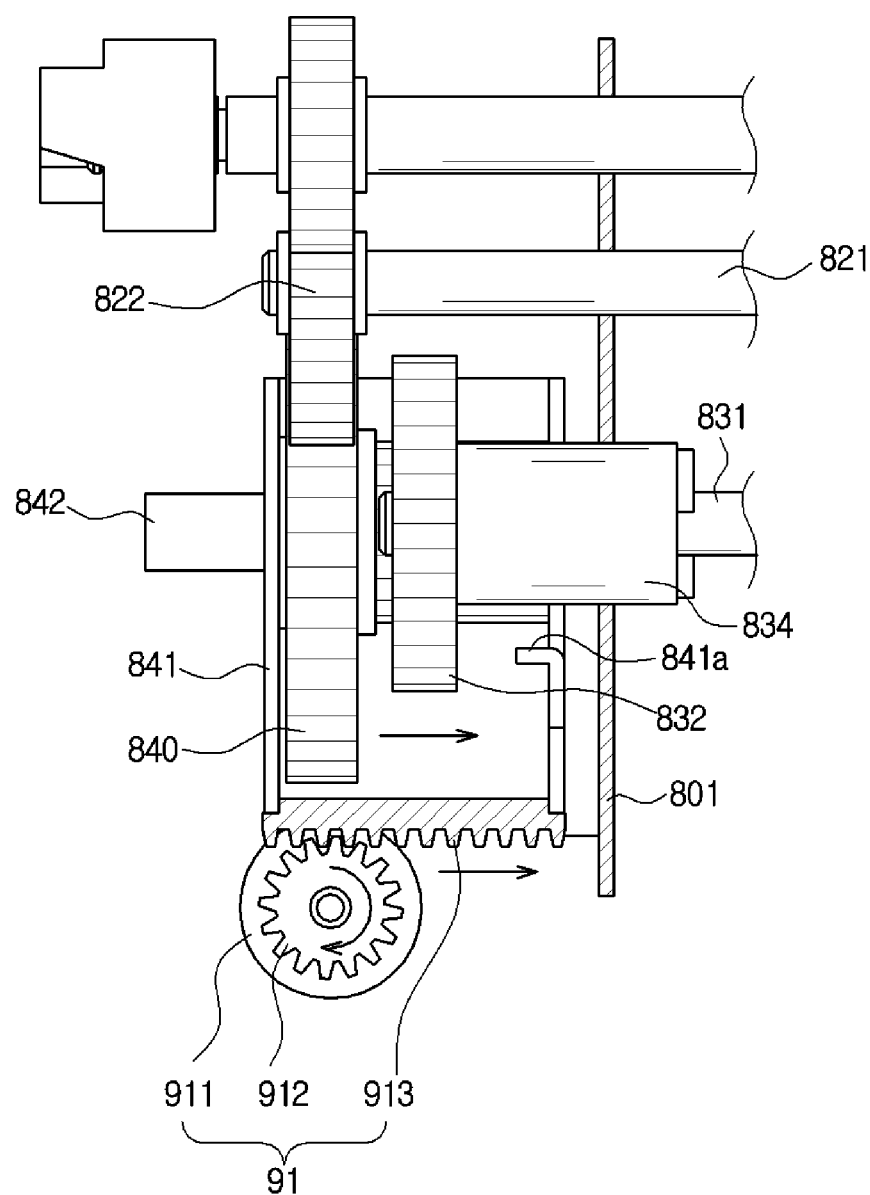
FIGS. 9A and 9B are views illustrating a second reversing gear moving device according to an embodiment of the present general inventive concept.
Figure 9B:
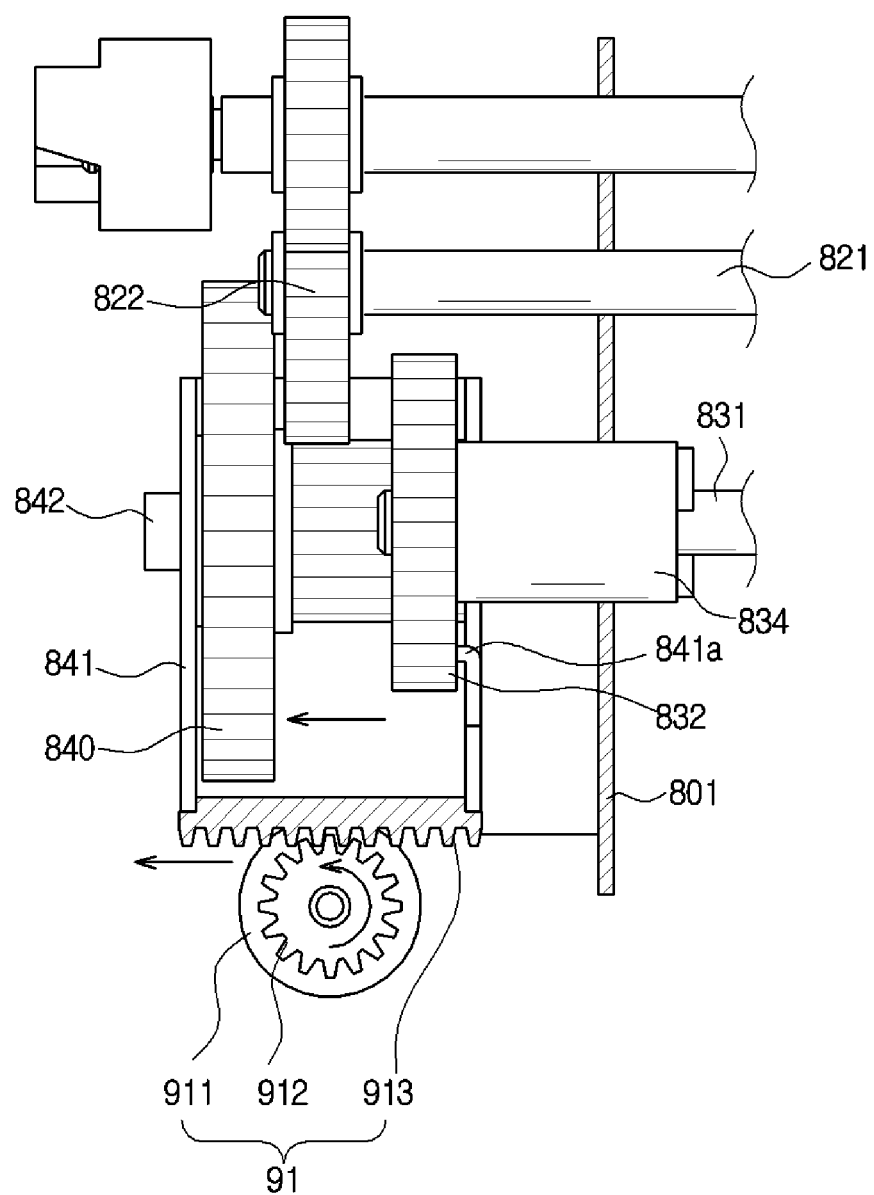

FIGS. 9A and 9B are views illustrating a second reversing gear moving device 91 according to an embodiment of the present general inventive concept.

Referring to FIGS. 9A and 9B, the second reversing gear moving device 91 may include a motor 911 and a gear (or pinion) 912 connected to the motor 911. A gear part (or rack) 913 corresponding to the gear 912 connected to the motor 911 may be provided at one side of the gear holder 841. The gear part 913 may be attached to the gear holder 841 to be disposed in the axial direction of the fixing shaft 842. It is possible that the gear part 913 may be formed with the gear holder 841 in a single integrated body or a single monolithic body. The gear 912 connected to the motor 911 may be engaged with the gear part 913 provided the gear holder 841. When the gear 912 is rotated by a driving force of the motor 911, the gear part 913 provided the gear holder 841 may be engaged with the gear 912 such that the gear holder 841 is moved in the axial direction of the fixing shaft 842. The second reverse gear 840 may be moved in the axial direction of the fixing shaft 842 together with the gear holder 841. The gear holder 841 may include a limiter 841a formed on a portion thereof to limit a movement of the gear holder 841 when the limiter 841a contacts a portion of the first reverse gear 832.

Since the second reverse gear 840 is moved in the axial direction of the fixing shaft 842 by the second reversing gear moving device 91 as described above, the second reverse gear 840 may be selectively engaged with the driving gear 822.

Figure 10A:
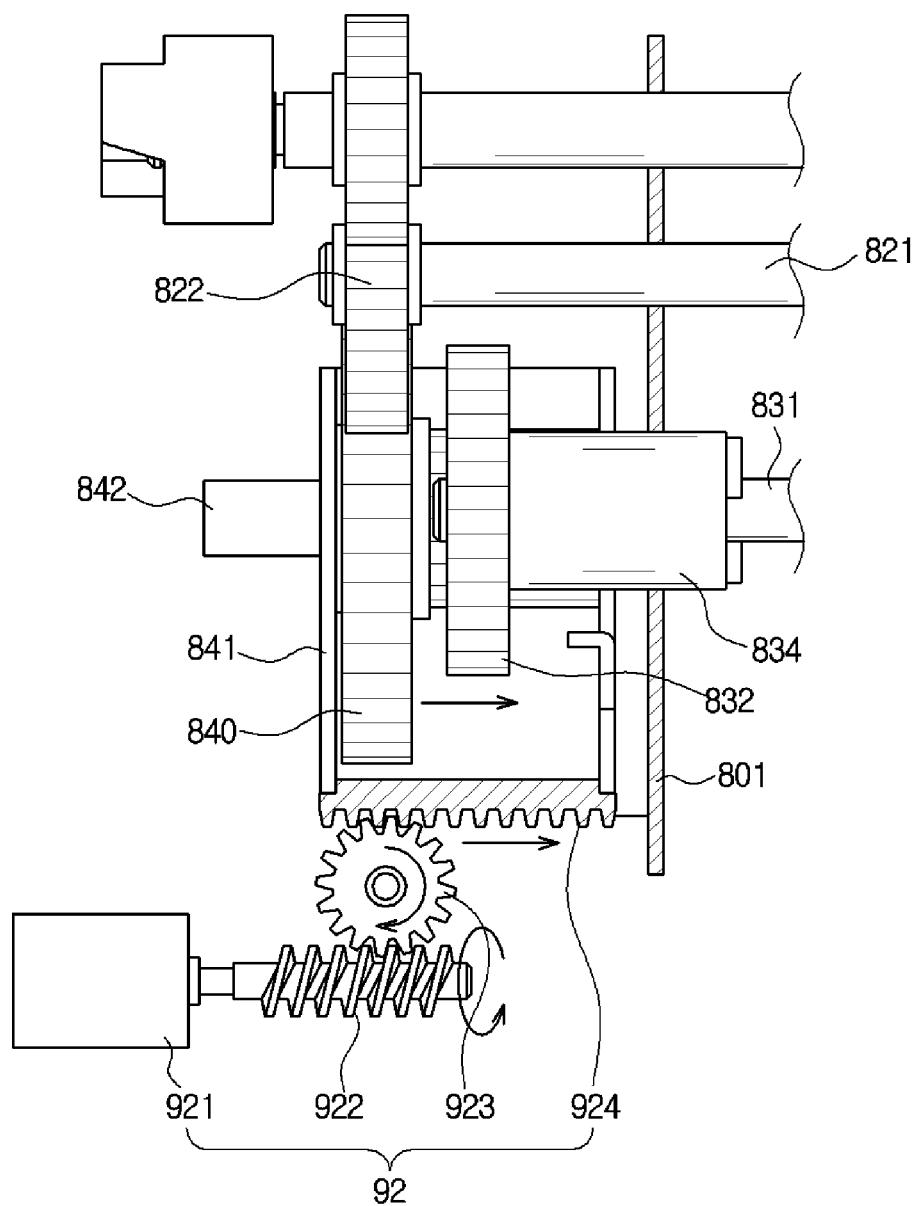
FIGS. 10A and 10B are views a second reversing gear moving device according to an embodiment of the present general inventive concept.
Figure 10B:
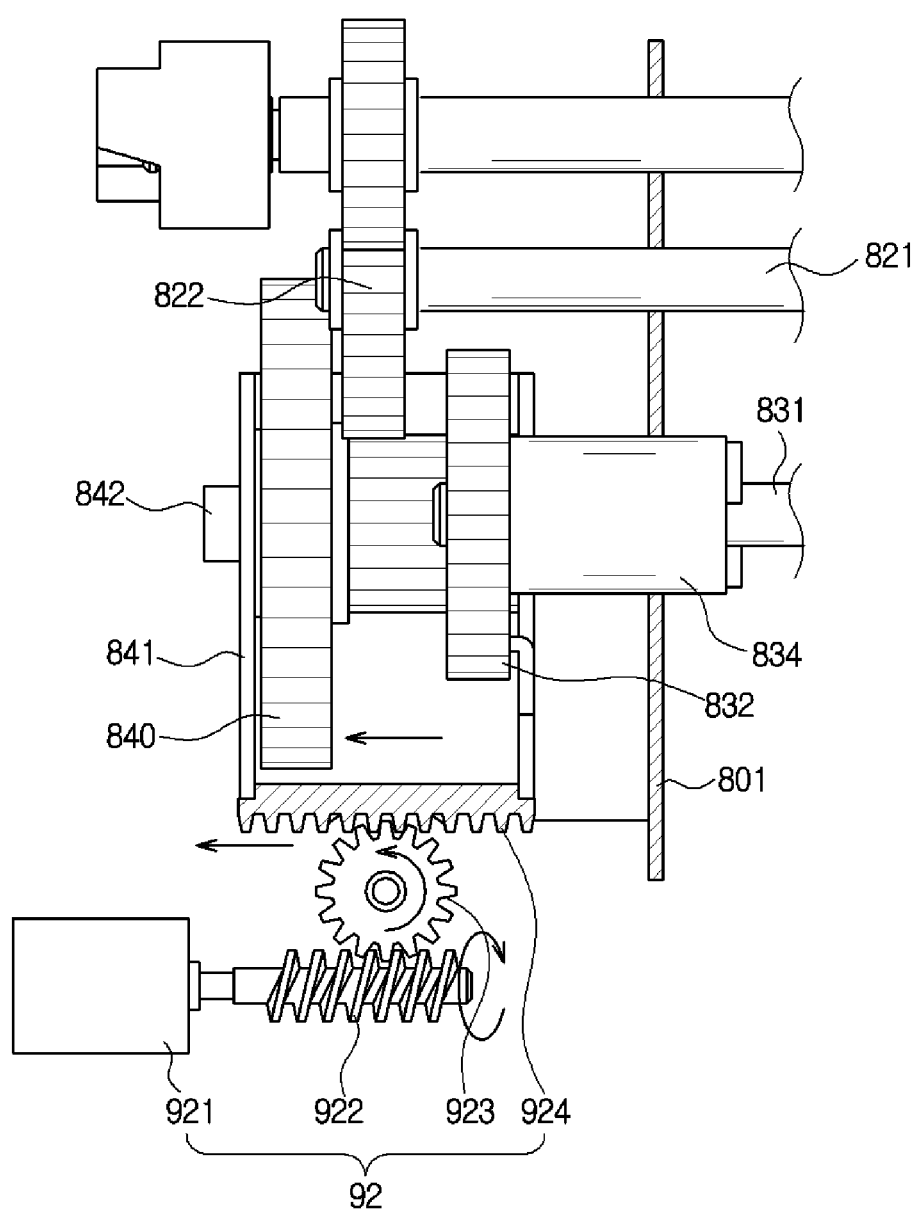

FIGS. 10A and 10B are views illustrating a second reversing gear moving device 92 according to an embodiment of the present general inventive concept.

Referring to FIGS. 10A and 10B, the second reversing gear moving device 92 includes a motor 921, a worm gear 922 connected to the motor 921, and a gear (or pinion) 923 engaged with the worm gear 922. A gear (rack) 924 engaged with the gear 923 may be provided at one side of the gear holder 841. The worm gear 922 connected to the motor 921 may be rotated by a driving force of the motor 931. When the worm gear 922 is rotated, the gear 923 engaged with the worm gear 922 may be rotated. Since the gear 923 is rotated while being engaged with the gear 924 provided at the gear holder 841, the gear holder 841 may be moved in the axial direction of the fixing shaft 842 according to rotation of the gear 923. The second reverse gear 840 may be moved in the axial direction of the fixing shaft 842 together with the gear holder 841.

Since the second reverse gear 840 is moved in the axial direction of the fixing shaft 842 by the second reversing gear moving device 92 as described above, the second reverse gear 840 may be selectively engaged with the driving gear 822.

Figure 11A:
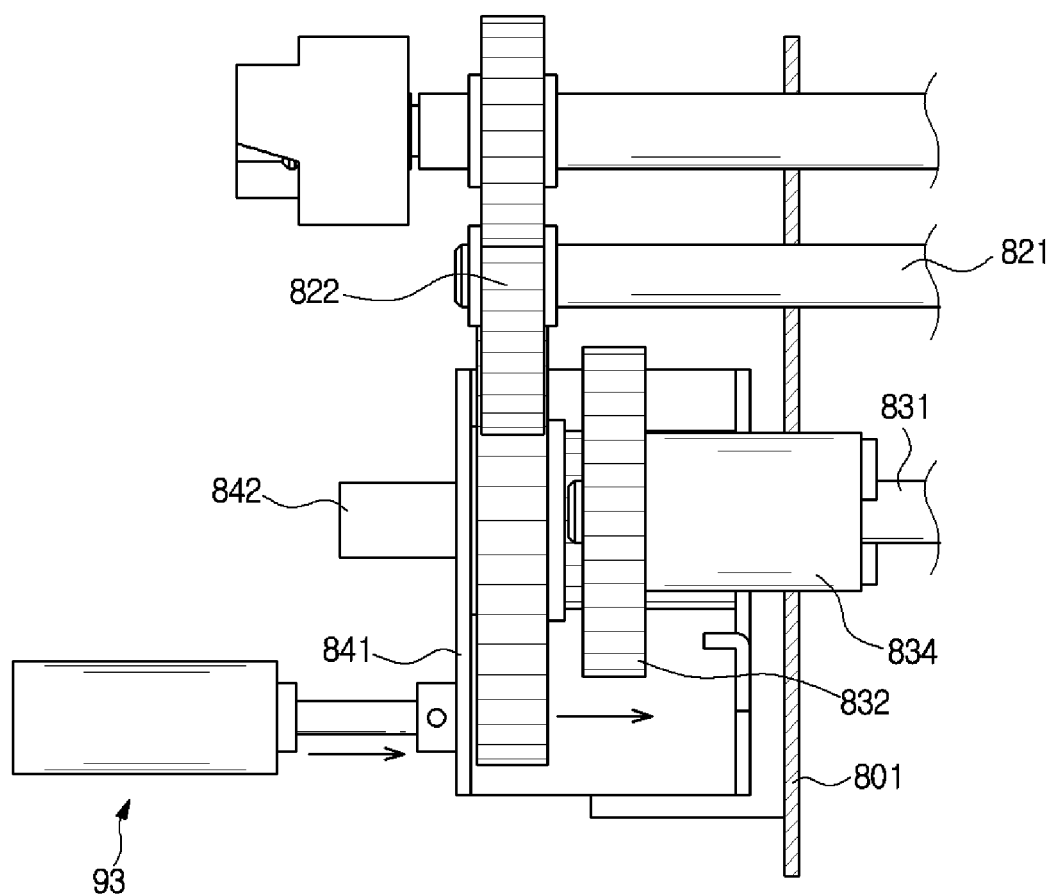
FIGS. 11A and 11B are views illustrating a second reversing gear moving device according to an embodiment of the present general inventive concept.
Figure 11B:
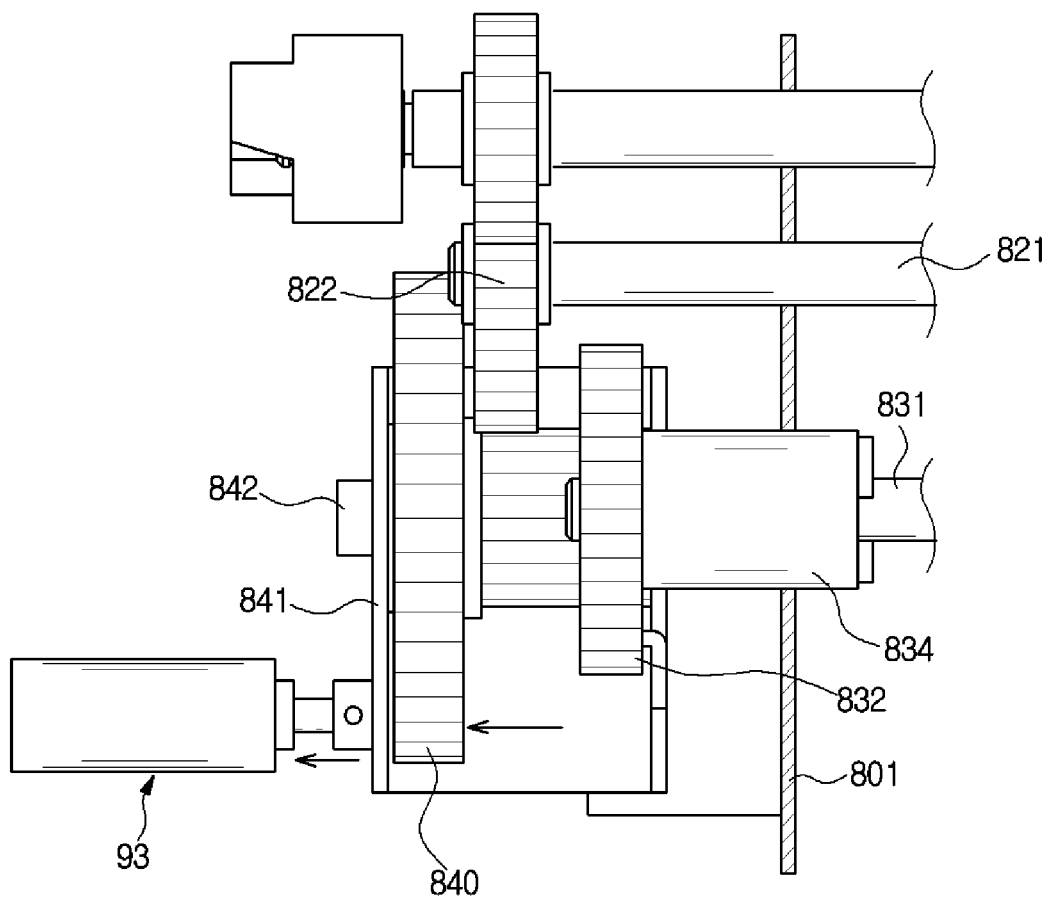

FIGS. 11A and 11B are views illustrating a second reversing gear moving device according to a further embodiment of the present invention.

Referring to FIGS. 11A and 11B, the second reversing gear moving device 93 may be a solenoid 93. The solenoid 93 may be installed on the apparatus body 10 or a portion of the sheet feeding device 80. The solenoid 93 may be connected to the gear holder 841 to move the gear holder 841 along the fixing shaft 842. The solenoid 93 may be a push type or pull type solenoid. A restoring force of the push type or pull type solenoid may be generated using an elastic force of an elastic member therein. For example, the push type solenoid may push the gear holder 841 such that the second reverse gear 840 is engaged with the driving gear 822 and the first reverse gear 832. The gear holder 841 and the second reverse gear 840 may be restored due to the elastic force of the elastic member such that the second reverse gear 840 is disengaged from the driving gear 822 and the first reverse gear 832.

Since the second reverse gear 840 is moved in the axial direction of the fixing shaft 842 by the second reversing gear moving device 93 as described above, the second reverse gear 840 may be selectively engaged with the driving gear 822.

Figure 12:
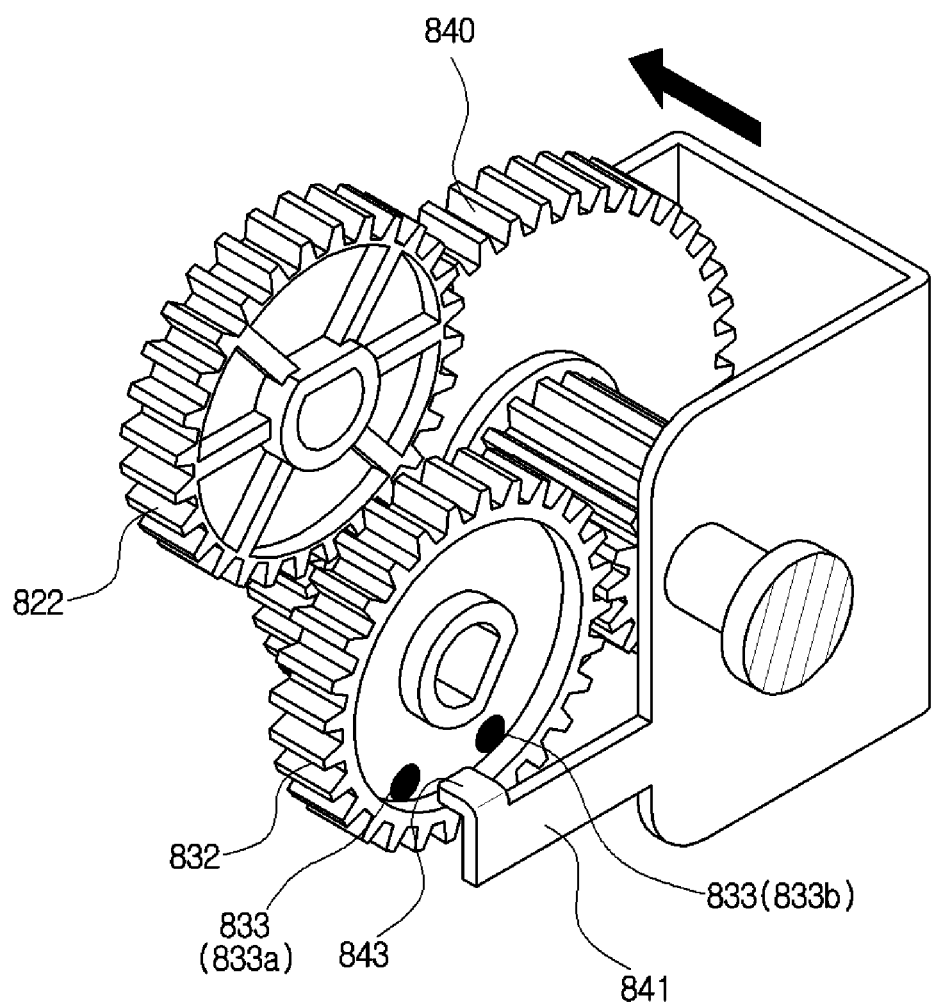
FIG. 12 is a view illustrating a first reversing gear rotation preventing device according to an embodiment of the present general inventive concept.

FIG. 12 is a view illustrating a first reversing gear rotation preventing device according to an embodiment of the present invention.

Referring to FIG. 12, the gear holder 841 may be provided with a fixing protrusion 843 to restrict the first reverse gear 832. An interference part 833 to interfere with the fixing protrusion 843 may be provided at one side of the first reverse gear 832. The interference part 333 may include one or more interference parts 333a and 333b formed on the first reverse gear 832 to correspond to the fixing protrusion 843.

For example, the fixing protrusion 843 may protrude forward from the gear holder 841 located at a rear side of the second reverse gear 840. The interference part 833 may be provided at a rear portion of the first reverse gear 832.

When the gear holder 841 and the second reverse gear 840 move backward along the fixing shaft 842 such that the second reverse gear 840 is engaged with the driving gear 822 and the first reverse gear 832, the fixing protrusion 843 is separated from the first reverse gear 832 and thus does not restrict the first reverse gear 832. Consequently, the first reverse gear 832 may be rotated while being engaged with the second reverse gear 840.

When the gear holder 841 and the second reverse gear 840 move forward in an arrow along the fixing shaft 842 such that the second reverse gear 840 is disengaged from the driving gear 822, the fixing protrusion 843 may be interfered with by the interference part 833 provided at the first reverse gear 832. As a result, the first reverse gear 832 is fixed, thereby preventing the rotation of the first reverse gear 832.

The structure configured to prevent rotation of the first reverse gear 832 is not limited thereto. As illustrated in FIGS. 4 and 6, the second reverse gear 840 may be provided with a one-way bearing 844 to prevent the rotation of the first reverse gear 832. Even when the retard shaft 831 is rotated, the first reverse gear 832 engaged with the second reverse gear 840 is fixed by the one-way bearing 844, thereby preventing the rotation of the first reverse gear 832.

When normal sheets S are fed as described above, the first reverse gear 832 may be fixed by the interference part 833 or the second reverse gear 840 engaged with the first reverse gear 832 may be fixed by the one-way bearing 844, thereby preventing rotation of the retard roller 830. When special sheets S having a low coefficient of friction are fed, interference of the first reverse gear 832 may be released such that the first reverse gear 832 is rotatable.

A user may select a feeding mode based on sheets loaded into the sheet supply device using a control panel provided at the image forming apparatus. When normal sheets are loaded into the sheet supply device, the user may select a normal print mode to feed the sheets in a state in which the second reverse gear 840 is disengaged from the driving gear 822. When special sheets having a lower coefficient of friction than normal sheets are loaded into the sheet supply device, the user may select a special print mode to feed the sheets in a state in which the second reverse gear 840 is engaged with the driving gear 822 and the first reverse gear 832 such that the retard roller 830 is rotated, thereby effectively preventing multiple feeding of the sheets.

As described above, the second reverse gear 840 may be moved forward or backward along the fixing shaft 842 such that the second reverse gear 840 is selectively engaged with or disengaged from the driving gear 822. When normal sheets S are fed or special sheets S having a lower coefficient of friction than the normal sheets are fed, therefore, proper separating operation may be performed based on types of the sheets S, thereby effectively preventing multiple feeding of the sheets S.

As is apparent from the above description, according to the embodiment of the present general inventive concept, a driving force may be selectively transmitted to the first reverse gear such that the retard roller is rotated. Consequently, optimum separating performance is provided based on various kinds of sheets having different materials, thicknesses, and friction forces, thereby achieving feeding of the sheets in a state in which the sheets are accurately separated from each other.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   an apparatus body; and
   a sheet feeding device to feed sheets into the apparatus body, the sheet feeding device comprising:
   a housing;
   a pickup unit provided in the housing to pick up the sheets;
   a forward roller to feed the sheets picked-up by the pickup unit;
   a driving gear to transmit a driving force from a driving source to the forward roller;
   a retard roller contacting the sheets;
   a first reverse gear selectively receiving the driving force such that the retard roller rotates in a same direction to the sheets' feeding direction or in an opposite direction to the sheets' feeding direction; and
   a second reverse gear engaged with the first reverse gear and the driving gear such that the second reverse gear selectively transmits the driving force from the driving gear to the first reverse gear,
   wherein the retard roller rotates in the opposite direction to the sheets' feeding direction when the driving force is transmitted to the first reverse gear via the second reverse gear.

2. The image forming apparatus of claim 1, wherein the second reverse gear is engaged with the driving gear when special sheets having a lower coefficient of friction than normal sheets are fed.

3. An image forming apparatus comprising:
   an apparatus body; and
   a sheet feeding device to feed sheets into the apparatus body, the sheet feeding device comprising:
   a housing;
   a pickup unit provided in the housing to pick up the sheets;
   a feeding part to feed the sheets picked-up by the pickup unit; and
   a multiple feeding prevention part rotated in an opposite direction to a feeding direction of the sheets to prevent multiple feeding of the sheets,
   wherein a driving force to drive the multiple feeding prevention part is selectively transmitted to the multiple feeding prevention part, and
   wherein the feeding part comprises:
   a forward roller to feed sheets;
   a forward shaft extending through the forward roller; and
   a driving gear mounted at the forward shaft such that the driving force is transmitted to the driving gear.

4. The image forming apparatus of claim 3, wherein the multiple feeding prevention part comprises:
   a retard roller contacting sheets;
   a retard shaft extending through the retard roller; and a first reverse gear mounted at the retard shaft such that the driving force is selectively transmitted to the first reverse gear.

5. The image forming apparatus of claim 4, wherein:
the retard shaft includes a torque limiter; and
the retard shaft is rotated in the same direction as the forward roller when a sheet feeding friction force is greater than a critical torque value of the torque limiter and the retard shaft is rotated in an opposite direction to the forward roller when the sheet feeding friction force is less than the critical torque value of the torque limiter.

6. The image forming apparatus of claim 4, wherein the housing includes a double gear type second reverse gear.

7. The image forming apparatus of claim 6, wherein the second reverse gear is engaged with the first reverse gear and is selectively engaged with the driving gear.

8. The image forming apparatus of claim 7, wherein:
the housing includes a fixing shaft; and
the second reverse gear is moved to a front or a rear of the fixing shaft such that the second reverse gear is selectively engaged with the driving gear.

9. The image forming apparatus of claim 8, wherein the second reverse gear is included in a gear holder such that the gear holder and the second reverse gear are moved together along the fixing shaft.

10. The image forming apparatus of claim 9, wherein the gear holder includes a gear part engaged with a gear connected to a motor and the gear holder and the second reverse gear are moved along the fixing shaft when the gear connected to the motor is rotated while being engaged with the gear part.

11. The image forming apparatus of claim 9, wherein the gear holder includes a fixing protrusion to selectively interfere with the first reverse gear.

12. The image forming apparatus of claim 11, wherein the fixing protrusion interferes with the first reverse gear to fix the first reverse gear in a state in which the second reverse gear is not engaged with the driving gear and the first reverse gear.

13. The image forming apparatus of claim 7, wherein the second reverse gear is engaged with the driving gear when sheets having a lower coefficient of friction than normal sheets are fed.

14. The image forming apparatus of claim 13, wherein the driving force transmitted to the driving gear is transmitted to the first reverse gear via the second reverse gear to rotate the first reverse gear.

15. The image forming apparatus of claim 14, wherein the retard roller is rotated in an opposite direction to the forward roller by the first reverse gear to prevent multiple feeding of sheets.

16. An image forming apparatus comprising:
an apparatus body; and
a sheet feeding device to feed sheets into the apparatus body, the sheet feeding device comprising:
a housing;
a pickup unit provided in the housing to pick up the sheets;
a forward roller to feed the sheets picked-up by the pickup unit;
a driving gear to transmit a driving force from a driving source to the forward roller;
a retard roller contacting the sheets;
a first reverse gear to selectively receive the driving force and to transmit the driving force to the retard roller;
a second reverse gear engaged with the first reverse gear and the driving gear to selectively transmit the driving force from the driving gear to the first reverse gear,
wherein the retard roller rotates in an opposite direction to the sheets' feeding direction when the driving force is transmitted to the first reverse gear via the second reverse gear.

* * * * *